Patented Oct. 19, 1943

2,332,418

UNITED STATES PATENT OFFICE 2,332,418

THIOCARBONATES OF AROMATIC POLY-HYDROXY COMPOUNDS

Georg Werner, Wiesbaden-Biebrich, Germany, assignor, by mesne assignments, to Winthrop Chemical Company, Inc., New York, N. Y., a corporation of New York No Drawing. Application September 7, 1940, Serial No. 355,809. In Germany March 29, 1938

6 Claims. (Cl. 260—327)

The present invention is a continuation in part of my copending application Serial No. 263,903, now U. S. Patent 2,276,553.

The invention relates to new products which may be characterized as thiocarbonates of aromatic poly-hydroxy compounds. They may also be designated as thiocarbonic acid O.S.-(1,2)-hydroxy-arylene esters. The new compounds correspond with the following formula:

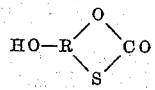

wherein R stands for a benzene or naphthalene nucleus, the heterocyclic ring being bound to the aromatic nucleus in 1.2-position.

In my copending application Serial No. 263,903 I have shown that the imino-thio-carbonates of aromatic poly-hydroxy compounds which correspond to the formula

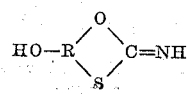

wherein R has the same meaning as mentioned above may be obtained by causing an agent yielding thiocyanogen to act upon an aromatic poly-hydroxy compound containing, with respect to one of the hydroxyl groups, a free ortho-position preferred for substitution and neutralizing the thiocyanic acid formed during the reaction. Suitable poly-hydroxy compounds are poly-hydroxy compounds of the benzene and naphthalene series which may be substituted, for instance, by halogen atoms for instance chlorine or bromine or by alkyl or aryl radicals, such as resorcinol, cresorcinol, orcinol, phloroglucinol, dihydroxy-naphthalenes and the like. The poly-hydroxy compounds may also contain as substituents etherified hydroxy groups such as alkoxy groups. Thus, there may be used as parent material, for instance 1.3-hydroxy-5-ethoxybenzene, 1.3-dihydroxy-6-methoxybenzene or 1.4-dihydroxy-5-methoxybenzene, provided that these compounds contain, with respect to one hydroxyl group, a free ortho-position preferred for substitution.

Now it has been found that the thiocarbonates free from nitrogen may be obtained by heating the solutions of the imino-compounds described in my copending application Serial No. 263,903 in aqueous mineral acids. In general a short heating of the hydrochloric acid solutions or the sulfuric acid solutions is sufficient. Many imino-thio-carbonates already decompose in the cold when they stand for a prolonged time in mineral acid solution. In most cases it is, however, preferable to boil the acid solutions of the imino compounds for about 10 minutes. The concentration of the imino-thiocarbonates in these solutions may amount to about 5–15%. The thiocarbonates of polyhydroxy compounds of the benzene or naphthalene series obtained in this manner constitute well crystallized new products which are, for instance, very suitable for being used as azo components in the production of azo dyestuffs. Moreover they may be employed as disinfecting means. Furthermore the new compounds are very suitable intermediate products in the manufacture of medicines and particularly dyestuffs as illustrated in the following examples.

The examples serve to illustrate the invention, but they are not intended to limit it thereto:

*Example 1.*—40 grams of potassium thiocyanate in 50 cc. of water are added, while stirring at room temperature, to a solution of 11 grams of resorcinol and 50 grams of crystallized copper sulfate in 250 cc. of water. The black cupric thiocyanate formed becomes colorless after a short time, which indicates that the introduction of thiocyanogen is terminated. The cuprous thiocyanate is removed by filtering with suction and then washed with water; the filtrate is mixed with 50 cc. of a 2n-sodium carbonate solution, whereby the imino-thiocarbonate of resorcinol

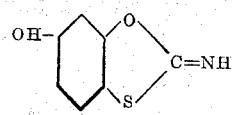

separates in the form of a colorless crystalline body. The yield amounts to 16 grams. The new compound which melts at 149° C. dissolves very easily in many organic solvents and in mineral acids. It forms well defined salts.

A 10% solution of the imino-thiocarbonate of resorcinol in 10% hydrochloric acid is heated for 15 minutes on the steam bath. The thiocarbonate free from nitrogen, which corresponds to the formula:

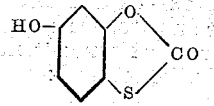

separates, on cooling, in the form of fine crystals melting at 158° C.

This thiocarbonate may easily be saponified with alkali so as to form 2.4-dihydroxy-phenyl-sulfide. This compound may be alkylated, for instance, with dimethyl sulfate, so as to form 2.4-dihydroxy-1-alkyl-mercapto-benzene. The latter compound is a well suitable azo component for the production of azo dyestuffs.

*Example 2.*—50 grams of crystallized copper sulfate in 100 cc. of water are added, while stirring at room temperature, to a solution of 16.2 grams of crystallized phloroglucinol and 36 grams of sodium thiocyanate of 90% strength, in 100 cc. of water. The cupric thiocyanate which is first formed becomes nearly instantaneously colorless, which proves that the thiocyanation has occurred very quickly. The solution is freed from the cuprous thiocyanate and the thiocyanic acid is neutralized by means of a 2n-sodium carbonate solution; the imino-thiocarbonate of phloroglucinol

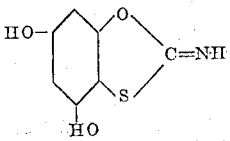

thereby separates. Any excess of sodium carbonate should be avoided, since it would again bring about dissolution. The new product, thus obtained, dissolves very easily in dilute acids; its hydrochloride forms very well defined crystals.

The imino-thiocarbonate of phloroglucinol is transformed in the sulfuric acid salt. The 10% aqueous solution of this salt is heated for a short time, for example, for half an hour on the steam bath. The imino radical is then split off, and the thiocarbonate free from nitrogen which corresponds to the following formula:

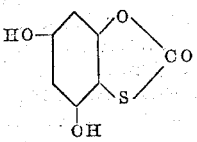

crystallizes, on cooling, in the form of long needles, melting at 181° C.

*Example 3.*—16 grams of 2.3-dihydroxy-naphthalene are dissolved in 100 cc. of alcohol and mixed, while stirring, with 40 grams of cupric thiocyanate. As soon as all of the cupric salt has been transformed into the cuprous salt, the reaction mixture is filtered and the imino-thiocarbonate of 2.3-dihydroxy-naphthalene

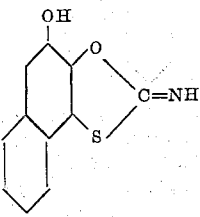

is precipitated by addition of sodium carbonate solution. The product, thus obtained, melts at 180° C.–181° C.; its hydrochloride is difficultly soluble in water.

The hydrochloride of the imino-thiocarbonate of 2.3-dihydroxy-naphthalene is heated with water on the steam bath. The thiocarbonate precipitates after a short time; it melts at 199° C. It corresponds to the formula:

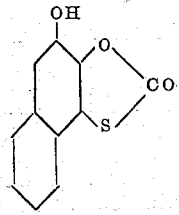

The same reaction may be carried out, for instance, with 2.7-dihydroxy-naphthalene, whereby a product of the formula:

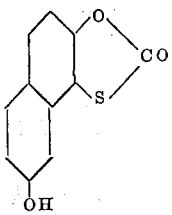

is obtained.

*Example 4.*—12.4 grams of anhydrous orcinol and 40 grams of cupric thiocyanate are stirred together in 70 cc. of methanol. As soon as the mixture has completely decolorized, the cuprous thiocyanate is filtered with suction; by addition of 50 cc. of 2n-sodium carbonate solution to the filtrate, the imino-thiocarbonate of orcionol

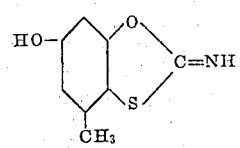

is precipitated, recrystallized from alcohol, the product melts after first becoming brown at 174° C.–175° C.

The imino-thiocarbonate of orcinol is hydrolyzed by means of hydrochloric acid in the manner described in Example 1. The thiocarbonate obtained melts at 140° C. It corresponds to the formula:

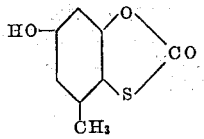

*Example 5.*—14.5 grams of 1-chloro-2.4-dihydroxy-benzene and 50 grams of crystallized copper sulfate are dissolved in 250 cc. of water, and 40 grams of potassium thiocyanate in 50 cc. of water are then added, while stirring. Decoloration immediately sets in. The imino-thiocarbonate of 1-chloro-2.4-dihydroxy-benzene

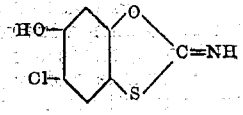

melts at 172° C.

A 5% solution of the imino-thiocarbonate of 1-chloro-2.4-dihydroxybenzene in 10% hydrochloric acid is heated for half an hour on the steam bath. On cooling, the thiocarbonate of the formula:

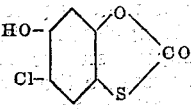

separates. It melts at 159° C. In an analogous manner, the thiocarbonate of 1-bromo-2.4-dihydroxy-benzene

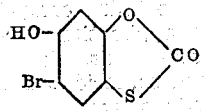

can be obtained from 1-bromo-2.4-dihydroxybenzene.

*Example 6.*—12.4 grams of 2.6-dihydroxy-toluene are dissolved in 100 cc. of alcohol of 50% strength, and there is added a mixture of 50 grams of crystallized copper sulfate in 100 cc. of water and 36 grams of sodium thiocyanate of 90% strength in 50 cc. of water. As soon as decoloration has occurred, the reaction mixture is filtered with suction and the imino-thiocarbonate of 2.6-dihydroxy-toluene

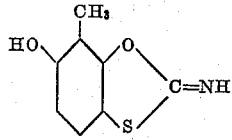

is precipitated by addition to the filtrate of dilute sodium carbonate solution. By hydrolyzing this compound in the manner described in Example 1, a thiocarbonate of the formula:

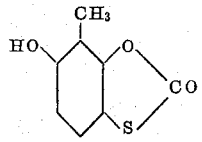

is obtained.

I claim:

1. As a new product, a substance of the following general formula:

wherein R stands for an aromatic nucleus selected from the group consisting of the benzene nucleus and the naphthalene nucleus, which nucleus R carries at least one substituent, namely a hydroxyl group, the heterocyclic ring being bound to the aromatic nucleus in 1.2-position.

2. As a new product, a substance of the following general formula:

wherein R stands for an aromatic nucleus selected from the group consisting of the benzene nucleus and the naphthalene nucleus, which nucleus R carries at least one hydroxyl group as substituent, the further positions of R being occupied by substituents selected from the group consisting of hydrogen, methyl, hydroxy, methoxy, ethoxy, chlorine and bromine, the heterocyclic ring being bound to the aromatic nucleus in 1.2-position.

3. As a new product, a substance of the following general formula:

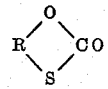

wherein R stands for a benzene nucleus which carries a hydroxyl group as substituent in para-position to the sulfur atom, the further positions of R being occupied by substituents selected from the group consisting of hydrogen, methyl, hydroxy, methoxy, ethoxy, chlorine and bromine, the heterocyclic ring being bound to the benzene nucleus in 1.2-position.

4. As a new product, a substance of the following formula

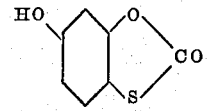

5. As a new product, a substance of the following formula

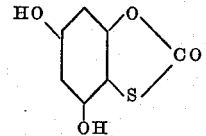

6. As a new product, a substance of the following formula

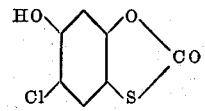

GEORG WERNER.